US012774724B2

(12) United States Patent
Karpenko et al.

(10) Patent No.: US 12,774,724 B2
(45) Date of Patent: Oct. 27, 2026

(54) DAMPING INSERT LOCATOR FOR A ROTOR CORE TOOL AND A BRAKE ROTOR EMPLOYING THE SAME

(71) Applicant: FORD GLOBAL TECHNOLOGIES, LLC, Dearborn, MI (US)

(72) Inventors: Yuri Anatoly Karpenko, Brighton, MI (US); Mauricio Gonzalez-Rocha, Novi, MI (US); Martin Tlaxca Rodriguez, Puebla (MX); Manoj Nelagadde, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 597 days.

(21) Appl. No.: 18/203,946

(22) Filed: May 31, 2023

(65) Prior Publication Data

US 2024/0401653 A1 Dec. 5, 2024

(51) Int. Cl.

| | |
|---|---|
| ***F16D 65/12*** | (2006.01) |
| ***B22C 9/10*** | (2006.01) |
| ***F16D 65/00*** | (2006.01) |
| *F16D 65/02* | (2006.01) |

(52) U.S. Cl.

CPC ............ *F16D 65/0006* (2013.01); *B22C 9/10* (2013.01); *F16D 65/12* (2013.01); *F16D 2065/1304* (2013.01); *F16D 2250/0015* (2013.01)

(58) Field of Classification Search

CPC ......... F16D 65/0006; F16D 65/12–128; F16D 2065/1304–1336; F16D 2250/0015; B22C 9/10

See application file for complete search history.

(56) References Cited

U.S. PATENT DOCUMENTS

| | | | |
|---|---|---|---|
| 3,286,799 | A | 11/1966 | Shilton |
| 5,004,078 | A | 4/1991 | Oono et al. |
| 5,184,663 | A | 2/1993 | Oono et al. |
| 5,358,080 | A | 10/1994 | Donabedian |
| 8,118,079 | B2 | 2/2012 | Hanna et al. |
| 8,245,758 | B2 | 8/2012 | Hanna et al. |
| 8,511,440 | B2 | 8/2013 | Kappagantu |
| 9,841,072 | B2 | 12/2017 | Karpenko et al. |

(Continued)

FOREIGN PATENT DOCUMENTS

| | | | |
|---|---|---|---|
| CA | 2352238 | A1 | 6/2000 |
| CN | 1062588 | A | 7/1992 |

(Continued)

*Primary Examiner* — David R Morris

(74) *Attorney, Agent, or Firm* — Burr & Forman; Lorne Forsythe

(57) ABSTRACT

A brake component for a motor vehicle may include a body having an axis, at least one cable comprising a plurality of wires where each of the plurality of wires has a surface in sliding contact with surfaces of adjacent wires of the plurality of wires, and a plurality of damping insert locators. The at least one cable may be embedded within the body concentric with the body about the axis. The plurality of damping insert locators may extend radially away from the axis such that a first instance of the damping insert locators constrains movement of the at least one cable in a first direction, and a second instance of the damping insert locators constrains movement of the at least one cable in a second direction, opposite the first direction.

10 Claims, 4 Drawing Sheets

(56) References Cited

U.S. PATENT DOCUMENTS

| | | | | |
|---|---|---|---|---|
| 10,060,495 | B2 | 8/2018 | Boileau et al. | |
| 10,197,120 | B2 | 2/2019 | Karpenko et al. | |
| 2004/0149420 | A1 | 8/2004 | Meroni et al. | |
| 2016/0097433 | A1 * | 4/2016 | Karpenko | F16D 65/092 164/112 |
| 2016/0341269 | A1 * | 11/2016 | Karpenko | B22D 19/00 |

FOREIGN PATENT DOCUMENTS

| | | | |
|---|---|---|---|
| CN | 102007316 | A | 4/2011 |
| CN | 207111779 | U | 8/2017 |
| JP | H0861403 | A | 3/1996 |

* cited by examiner

DAMPING INSERT LOCATOR FOR A ROTOR CORE TOOL AND A BRAKE ROTOR EMPLOYING THE SAME

TECHNICAL FIELD

Example embodiments generally relate to automotive brakes and, more particularly, relate to a brake core tool for casting a rotor using a damping insert locator.

BACKGROUND

Some brake rotor designs employ friction damping via insertion of friction dampers within the brake rotor core tool so that the friction dampers are embedded inside the brake rotor. To retain the friction dampers at desired locations within a rotor core tool, damper locators have generally been placed underneath the friction dampers for support. Such support, only in one direction, may lead to undesirable outcomes that could be prevented.

BRIEF SUMMARY OF SOME EXAMPLES

In accordance with an example embodiment, a brake component for a motor vehicle may be provided. The brake component may include a body having an axis, at least one cable comprising a plurality of wires where each of the plurality of wires has a surface in sliding contact with surfaces of adjacent wires of the plurality of wires, and a plurality of damping insert locators. The at least one cable may be embedded within the body concentric with the body about the axis. The plurality of damping insert locators may extend radially away from the axis such that a first instance of the damping insert locators constrains movement of the at least one cable in a first direction, and a second instance of the damping insert locators constrains movement of the at least one cable in a second direction, opposite the first direction.

In another example embodiment, a rotor core tool for casting a brake rotor for a motor vehicle may be provided. The rotor core tool may include a rotor core tool base including a circumferential boundary wall that extends substantially perpendicularly away from a side boundary wall that forms a bottom portion of the rotor core tool base. The circumferential boundary wall may be spaced apart from an axis of the rotor core tool base by a diameter of the brake rotor. The rotor core tool may further include at least one cable comprising a plurality of wires where each of the plurality of wires has a surface in sliding contact with surfaces of adjacent wires of the plurality of wires. The at least one cable may be concentric with the circumferential boundary about the axis. The rotor core tool may further include an outer annular ring disposed at the side boundary wall and concentric with the circumferential boundary about the axis, an inner annular ring disposed at the side boundary wall and concentric with the circumferential boundary about the axis, the inner annular ring having a smaller diameter than the outer annular ring, and a plurality of damping insert locators extending radially away from the axis such that a first instance of the damping insert locators constrains movement of the at least one cable in a first direction, and a second instance of the damping insert locators constrains movement of the at least one cable in a second direction, opposite the first direction.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
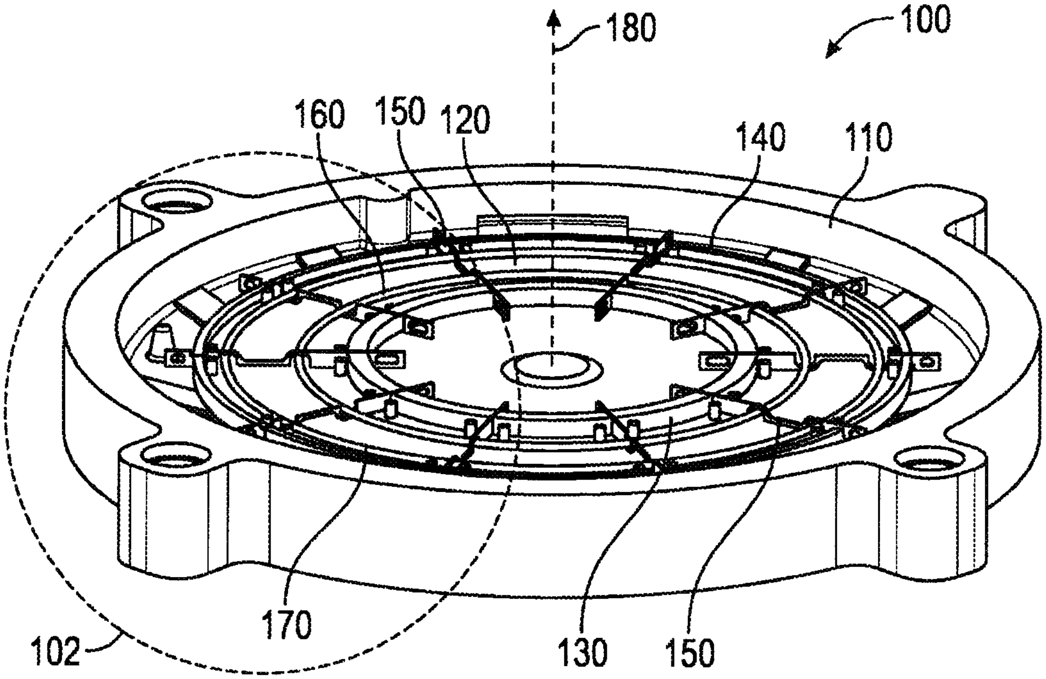
FIG. 1 illustrates a perspective view of a rotor core tool base of a rotor core tool in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As noted above, conventional rotor core tools employ damper locators that support friction dampers only on one side, or in one direction. Such support, only in one direction, may lead to undesirable outcomes that could be prevented. In particular, for example, this method of support may inadvertently facilitate thermal distortion. Example embodiments provide a simpler and more efficient structure for supporting friction dampers that, despite its simplicity and efficiency, actually performs better than conventional methods.

In this regard, conventional damper locators support only one side of the friction dampers, and thus the damper locators are effectively positioned in the same plane as the friction damper (e.g., parallel to the brake rotor plate surface), which is the weakest bending direction for both the friction dampers and the damper locators. Since thermal distortion or deflection takes place in the weakest bending direction of the structure, both the damper locators and the friction dampers may deform slightly toward the brake plate surface. In some cases, a portion of the friction damper surface may be exposed at the brake plate surface due to this deformation, and the resultant part may not pass quality inspection as a result.

To mitigate any possibility of coupling (e.g., combined deformation) between the damper locator and the friction damper, example embodiments position damper locator inserts in the vertical plane of the rotor plate. Moreover, to allow a relative freedom for the friction damper to move in more than just a single direction, the damper locator inserts of an example embodiment are designed with relatively large cutouts, and cutouts that alternate in relative location to the friction damper (e.g., above and below) in sequence both in the radial direction and while moving along the circumference of the friction damper.

By positioning the damper locator inserts in this way, the damper locator inserts provide intermittent constraints at the bottom and at the top of the friction dampers inside the rotor core tool, where the bottom and top constraints take place after each other. This alternating locating of the support provided to the friction dampers (e.g., top and bottom) allows a relative freedom for the friction dampers to extend under heat input associated with the casting process. Thus, the rotor core tool design described herein allows for reliable and efficient production of high quality friction damped rotors.

Figure 2:
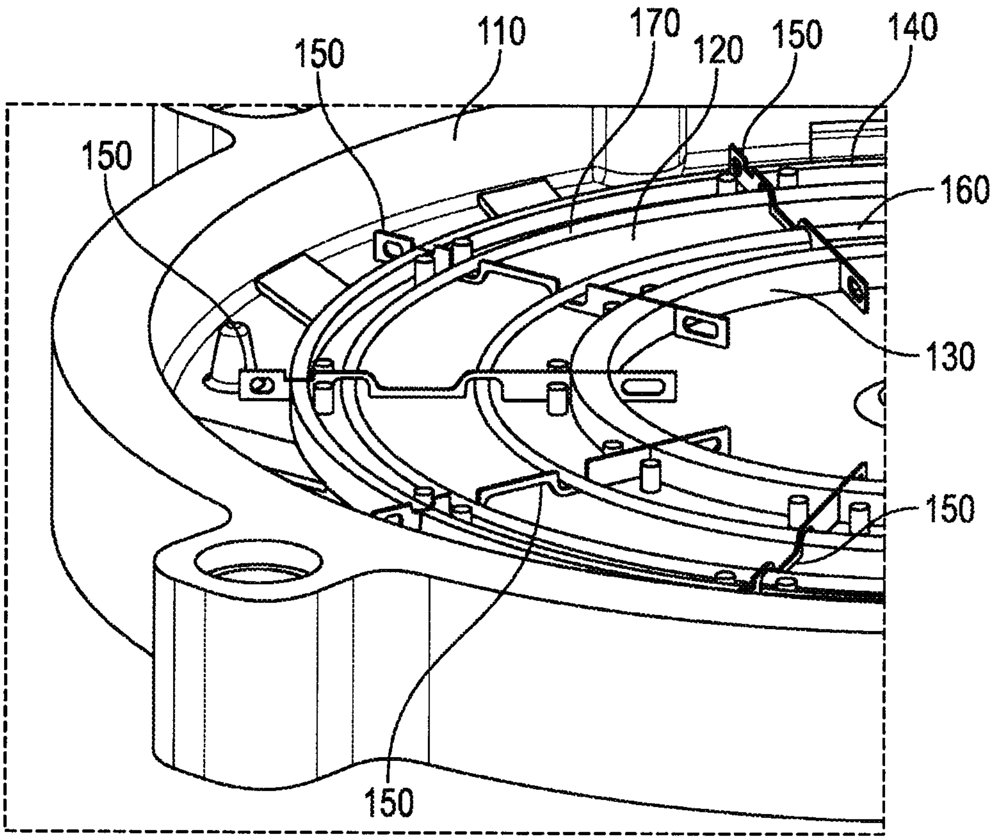
FIG. 2 illustrates a perspective view of a portion of the rotor core tool base of FIG. 1 in greater detail in accordance with an example embodiment.

FIG. 1 illustrates a perspective view of a rotor core tool base 100 of a rotor core tool in accordance with an example embodiment. FIG. 1 includes a circled portion 102 that is shown in greater detail in FIG. 2. The rotor core tool base 100 may be used to form a pattern in sand that is used to form a mold for metal that will ultimately take the form of a rotor that has been formed in the sand mold. In this regard, sand casting generally involves using a core tool through which sand is blown in order to form a mold tool from sand. The core tool base 100 forms a mold for one side of the rotor that will be cast therein, and a core tool top portion may similarly have sand blown therein to form a mold tool top portion, also from sand. A special gate system may then be used to fill the sand box or mold tool that has been formed with flowing metal that fills the mold and ultimately forms a rotor. Referring to FIGS. 1 and 2, the rotor core tool base 100 includes a circumferential boundary wall 110 that extends substantially perpendicularly away from a side boundary wall 120 that forms a bottom portion of the rotor core tool base 100.

The circumferential boundary wall 110 may lie adjacent to (and facilitate formation of) the outer radial circumference of the rotor that is molded inside the rotor mold tool formed in sand inside the core tool base 100. The side boundary wall 120 may lie adjacent to (and facilitate formation of) one side or friction surface of the rotor that is molded inside the rotor mold tool formed in sand inside the core tool base 100. As can be appreciated, the opposite side or friction surface of the rotor may be adjacent to the top portion of the rotor mold tool formed in sand inside a core tool top portion.

In an example embodiment, the rotor core tool base 100 may include an inner annular ring 130 that may form an inner boundary for the friction surface of the resultant rotor that is molded in the rotor mold tool formed in sand inside the core tool base 100. The rotor core tool base 100 may also include an outer annular ring 140 that may have a larger diameter than the inner annular ring 130, and which is spaced apart from the inner annular ring 130 and the circumferential boundary wall 110. Damping rings may be desirably embedded inside the rotor, as mentioned above, and those damping rings may be desirable to have located within the portion of the rotor cast in the rotor mold tool that has frictional contact with other braking components. The support of those damping rings is normally done on only one side, and in a plane parallel to the plane of the surfaces of the rotor (i.e., the friction surfaces). However, example embodiments change this paradigm by providing multiple instances of damper locator inserts 150 that are inserted into the rotor core tool base 100 as described herein to support opposite sides of the damping rings.

In this regard, for example, the damper locator inserts 150 may be installed to extend at least between (and in some cases beyond) the inner annular ring 130 and the outer annular ring 140, and may be disposed substantially perpendicular to the plane of the friction surfaces of the rotor. The damper locator inserts 150 may support, and facilitate proper location of, a first friction damping ring 160 and a second friction damping ring 170. The first and second friction damping rings 160 and 170 may each be concentric with the inner annular ring 130 and the outer annular ring 140 and an axis 180 of the rotor. The first friction damping ring 160 of this example has a smaller diameter than the second friction damping ring 170. Meanwhile, both of the first and second friction damping rings 160 and 170 have a smaller diameter than the outer annular ring 140, and both the first and second friction damping rings 160 and 170 have a larger diameter than the inner annular ring 130.

In order to keep the first and second friction damping rings 160 and 170 entirely within a rotor body of the resultant rotor that can be cast using the rotor core tool base 100, the damper locator inserts 150 may extend radially outwardly from the axis 180 between the inner and outer annular rings 130 and 140 while alternately supporting or constraining top and bottom portions of the first and second friction damping rings 160 and 170. To provide this alternating support, each instance of the damper locator inserts 150 may be angularly displaced from adjacent damper locator inserts by a substantially similar (or identical) angular difference. In the example shown, since there are ten instances of the damper locator inserts 150, the full 360 degree circumference of each of the first and second friction damping rings 160 and 170 can be supported by spacing the damper locator inserts 150 apart from each other by about 36 degrees. A different number (more or less) of damper locator inserts 150 could be employed in alternative embodiments, and the angular separation between them would normally be 360 degrees divided by the number of damper locator inserts 150.

The provision of alternating top and bottom support for the first and second friction damping rings 160 and 170 may be accomplished in the most efficient manner by designing the damper locator inserts 150 to be interchangeably used for each adjacent instance by simply flipping the orientation of alternate instances of the damper locator inserts 150. Thus, a design of the damper locator inserts 150 to facilitate this simple and efficient operation may be helpful in this regard.

Figure 3:
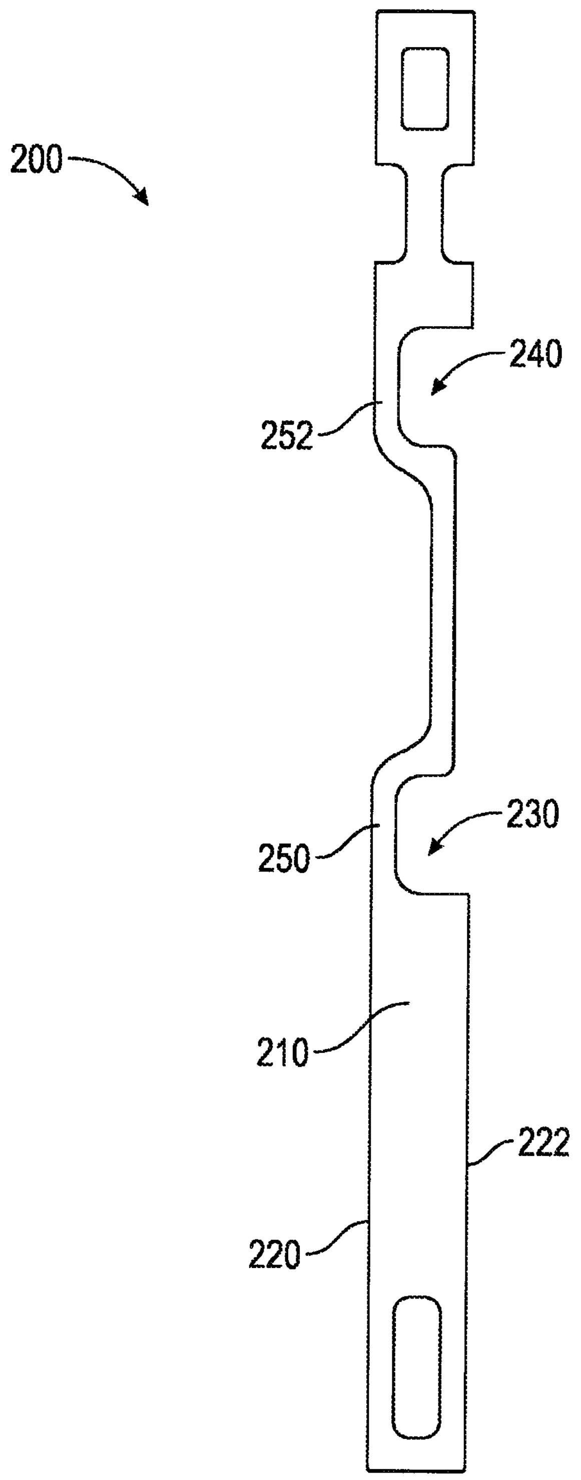
FIG. 3 illustrates a side view of a first face of damping insert locator in accordance with an example embodiment.

FIG. 3 illustrates a side view of one instance of the damper locator inserts 150 shown in FIGS. 1 and 2. In this regard, the damper locator insert 150 of FIG. 3 includes an elongated planar member 200 having a first face 210 facing the viewer of FIG. 3, and a second face that is a mirror image of the first face 210, which is facing away from the viewer of FIG. 3. The first face 210 and the second face are separated from each other by a first contact side 220 and a second contact side 222 that each have a relatively small (and identical) length that defines a thickness of the elongated planar member 200. One of the first and second contact sides 220 and 222 (in this case the second contact side 222) may have a first cutout portion 230 and a second cutout portion 240 formed therein by removal of material of the elongated planar member 200 from the second contact side 222 to extend toward respective instances of a first support portion 250 and a second support portion 252. The first and second cutout portions 230 and 240 may each have a width that is at least two times a diameter of the first and second friction damping rings 160 and 170. This width provides room for movement of the first and second friction damping rings 160 and 170 in-plane responsive to thermal stress, but will constrain movement out of plane (i.e., perpendicular to the friction surfaces and therefore possible exposure) since alternating and adjacent ones of the elongated planar member 200 are faced in opposite directions to constrain both upward and downward movement.

In practice, the first contact side 220 of a first instance of the damper locator insert 150 may contact the side boundary wall 120 of the rotor core tool base 100 such that the first and second friction damping rings 160 and 170 may fit into the first and second cutout portions 230 and 240 respectively. With this arrangement, the first and second support portions 250 and 252 are disposed between the respective instances of the first and second friction damping rings 160 and 170 and the side boundary wall 120. The first and second support portions 250 and 252 therefore support a first side (e.g., a bottom side) of the first and second friction damping rings 160 and 170.

A second instance of the damper locator insert 150 may be placed adjacent to the first instance of the damper locator insert 150 angularly spaced apart from the first instance of the damper locator insert 150 (e.g., by 36 degrees in this example). The second instance of the damper locator insert 150 may be arranged such that the second contact side 222 thereof contacts the side boundary wall 120 of the rotor core tool base 100 such that the first and second friction damping rings 160 and 170 may fit into the first and second cutout portions 230 and 240 respectively. With this arrangement, the first and second support portions 250 and 252 are disposed opposite the side boundary wall 120 with respect to respective instances of the first and second friction damping rings 160 and 170. The first and second support portions 250 and 252 therefore constrain a second side (e.g., a top side) of the first and second friction damping rings 160 and 170.

This alternating arrangement of the instances of the damper locator inserts 150 may continue and be repeated all the way around the rotor core tool base 100 so that no adjacent instances of the damper locator inserts 150 have the same orientation. Instead, each is flipped in orientation relative to its neighbors. This alternating of constraining directions enables thermal distortion of the dampers during the casting process. Moreover, because the same design can be used for both the first and second instances of the damper locator insert 150 by simply flipping the side that contacts the side boundary wall 120, constraining movement of the first and second friction damping rings 160 and 170 by adjacent damper locator inserts 150 in opposing directions may be accomplished in an efficient manner, and without need for separate and different parts for each different direction of constraint.

Figure 4:
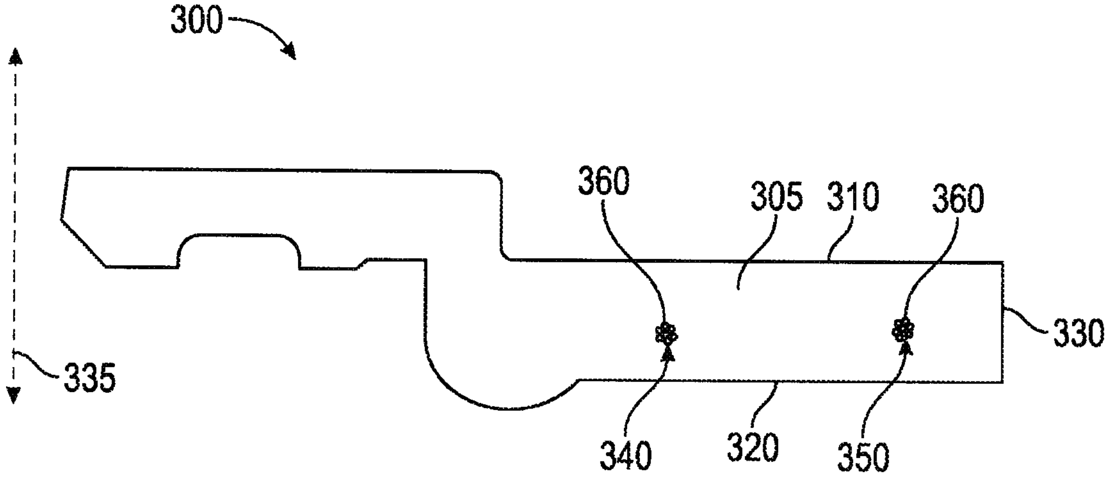
FIG. 4 illustrates a cross section view of a rotor that may have been molded within a rotor core tool base in accordance with an example embodiment.

FIG. 4 illustrates a cross section view of a rotor 300 having a body 305 formed between a first friction surface 310 and a second friction surface 320, along with circumferential wall 330. An axis 335 of the rotor 300 is shown for reference. It may be appreciated that if cast in a mold similar to the rotor core tool base 100 of FIGS. 1 and 2, the circumferential wall 330 would be adjacent to the circumferential boundary wall 110, and the second friction surface 320 would be adjacent to the side boundary wall 120. The rotor 300 further includes, embedded within the body 305, a first damping cable 340 and a second damping cable 350. The first and second damping cables are specific examples of the first and second friction damping rings 160 and 170 of FIGS. 1 and 2. In this regard, each of the first and second damping cables 340 and 350 is made from a plurality of individual strands of wire 360. The individual strands of wire 360 may be twisted or parallel to each other, but may in either case be effective to increase the damping capacity of the rotor 300. The individual strands of wire 360 each have a surface in sliding contact with surfaces of adjacent wires, and such sliding contact is effective at damping vibration, noise, and/or the like. Since the body 305 of the rotor 300 is often made by grey cast iron material, which has a relatively low damping capacity, the rotor 300 may (if not properly damped) have a resonant vibration amplitude that could build up and create an objectionable squealing noise. By increasing the damping capacity of the rotor 300 through introduction of the first and second damping cables 340 and 350, prevention of squeal noises may be achieved. Moreover, as noted above, by employing the damper locator inserts 150, the possibility of the first and second damping cables 340 and 350 being deformed during the casting process is reduced, and it becomes unlikely that any portion of the first and second damping cables 340 and 350 may be exposed at either of the first and second friction surfaces 310 and 320.

Example embodiments may therefore be used to define a brake component (e.g., a brake rotor) for a motor vehicle that ultimately includes a body having an axis and at least one cable that includes a plurality of wires. Each of the plurality of wires may have a surface in sliding contact with surfaces of adjacent wires of the plurality of wires. The at least one cable may be embedded within the body coaxial with the axis. The brake component may further include a plurality of damping insert locators extending radially away from the axis of the body such that each of the damping insert locators alternately supports a top side or a bottom side of the at least one cable relative to an adjacent damping insert locator.

The brake component or a rotor core tool for making such a brake component (and more particularly the damping insert locators) of some embodiments may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the first and second instances of the damping insert locators may each have an identical shape, and an orientation of the first and second instances of the damping insert locators may be flipped to provide constraining of movement of the at least one cable in alternate ones of the first and second directions. In an example embodiment, the body of the rotor may be elongated in a first plane between a first friction surface on one side of the body and a second friction surface on an opposite side of the body, and the first and second instances of the damping insert locators may be arranged in a second plane substantially perpendicular to the first plane. In some cases, the first and second instances of the damping insert locators may be identical in structure, but reversed in orientation relative to the at least one cable by rotation of the second instance of the damping insert 180 degrees in the second plane relative to the first instance of the damping insert locator. In an example embodiment, the first and second instances of the damping insert locators may each comprise an elongate planar member having a first face and a second face separated from each other by a first contact side and a second contact side on opposing lateral sides of the first and second faces. The second contact side may include a cutout portion defining a corresponding support portion disposed between the cutout portion and the first contact side, and the support portion may constrain movement of the at least one cable in the first direction responsive to the first contact side being disposed proximate a side boundary wall of a rotor core tool prior to casting of the body, and constrain movement of the at least one cable in the second direction responsive to the second contact side being disposed proximate the side boundary wall of the rotor core tool prior to casting of the body. In some cases, the at least one cable may include a first friction damping ring having a first diameter, and a second friction damping ring having a second diameter larger than the first diameter, where the first and second damping rings are concentric about the axis. In an example embodiment, the first instance of the damping insert locators may be disposed proximate to a bottom side of both the first and second damping rings, and the second instance of the damping insert locators is disposed proximate to a top side of both the first and second damping rings. In some cases, the brake component may further include a series of additional damping insert locators provided in sequence to alternate between being proximate to the top side and the bottom side of both the first and second damping rings. In an example embodiment, the first and second instances of the damping insert locators may each include an elongate planar member having a first face and a second face separated from each other by a first contact side and a second contact side on opposing lateral sides of the first and second faces. The second contact side may include a first cutout portion defining a corresponding first support portion disposed between the first cutout portion and the first contact side, and a second cutout portion defining a corresponding second support portion disposed between the second cutout portion and the first contact side. The first and second support portions may constrain movement of the first and second friction damping rings in the first direction responsive to the first contact side being disposed proximate a side boundary wall of a rotor core tool prior to casting of the body, and constrain movement of the first and second friction damping rings in the second direction responsive to the second contact side being disposed proximate the side boundary wall of the rotor core tool prior to casting of the body.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A brake component for a motor vehicle, the brake component comprising:

a body having an axis;

at least one cable comprising a plurality of wires, each of the plurality of wires having a surface in sliding contact with surfaces of adjacent wires of the plurality of wires, wherein the at least one cable is embedded within the body concentric with the body about the axis; and a plurality of damping insert locators extending radially away from the axis such that a first instance of the damping insert locators constrains movement of the at least one cable in a first direction, and a second instance of the damping insert locators constrains movement of the at least one cable in a second direction, opposite the first direction, wherein the first and second instances of the damping insert locators each have an identical shape, and wherein orientation of the first and second instances of the damping insert locators is flipped to provide constraining of movement of the at least one cable in alternate ones of the first and second directions.

2. The brake component of claim 1, wherein the body of the rotor is elongated in a first plane between a first friction surface on one side of the body and a second friction surface on an opposite side of the body, and wherein the first and second instances of the damping insert locators are arranged in a second plane substantially perpendicular to the first plane.

3. The brake component of claim 2, wherein the first and second instances of the damping insert locators are identical in structure, but reversed in orientation relative to the at least one cable by rotation of the second instance of the damping insert 180 degrees in the second plane relative to the first instance of the damping insert locator.

4. The brake component of claim 1, wherein the first and second instances of the damping insert locators each comprise an elongate planar member having a first face and a second face separated from each other by a first contact side and a second contact side on opposing lateral sides of the first and second faces, wherein the second contact side comprises a cutout portion defining a corresponding support portion disposed between the cutout portion and the first contact side, and wherein the support portion constrains movement of the at least one cable in the first direction responsive to the first contact side being disposed proximate a side boundary wall of a rotor core tool prior to casting of the body, and constrains movement of the at least one cable in the second direction responsive to the second contact side being disposed proximate the side boundary wall of the rotor core tool prior to casting of the body.

5. The brake component of claim 1, wherein the at least one cable comprises a first friction damping ring having a first diameter, and a second friction damping ring having a second diameter larger than the first diameter, the first and second damping rings being concentric about the axis.

6. The brake component of claim 5, wherein the first instance of the damping insert locators is disposed proximate to a bottom side of both the first and second damping rings, and the second instance of the damping insert locators is disposed proximate to a top side of both the first and second damping rings.

7. The brake component of claim 6, further comprising a series of additional damping insert locators provided in sequence to alternate between being proximate to the top side and the bottom side of both the first and second damping rings.

8. The brake component of claim 5, wherein the first and second instances of the damping insert locators each comprise an elongate planar member having a first face and a second face separated from each other by a first contact side and a second contact side on opposing lateral sides of the first and second faces, wherein the second contact side comprises a first cutout portion defining a corresponding first support portion disposed between the first cutout portion and the first contact side, and a second cutout portion defining a corresponding second support portion disposed between the second cutout portion and the first contact side, and wherein the first and second support portions constrain movement of the first and second friction damping rings in the first direction responsive to the first contact side being disposed proximate a side boundary wall of a rotor core tool prior to casting of the body, and constrain movement of the first and second friction damping rings in the second direction responsive to the second contact side being disposed proximate the side boundary wall of the rotor core tool prior to casting of the body.

9. A brake component for a motor vehicle, the brake component comprising:

a body having an axis;

at least one cable comprising a plurality of wires, each of the plurality of wires having a surface in sliding contact with surfaces of adjacent wires of the plurality of wires, wherein the at least one cable is embedded within the body concentric with the body about the axis; and a plurality of damping insert locators extending radially away from the axis such that a first instance of the damping insert locators constrains movement of the at least one cable in a first direction, and a second instance of the damping insert locators constrains movement of the at least one cable in a second direction, opposite the first direction, wherein the first and second instances of the damping insert locators each comprise an elongate planar member having a first face and a second face separated from each other by a first contact side and a second contact side on opposing lateral sides of the first and second faces, wherein the second contact side comprises a cutout portion defining a corresponding support portion disposed between the cutout portion and the first contact side, and wherein the support portion constrains movement of the at least one cable in the first direction responsive to the first contact side being disposed proximate a side boundary wall of a rotor core tool prior to casting of the body, and constrains movement of the at least one cable in the second direction responsive to the second contact side being disposed proximate the side boundary wall of the rotor core tool prior to casting of the body.

10. A brake component for a motor vehicle, the brake component comprising:

a body having an axis;

at least one cable comprising a plurality of wires, each of the plurality of wires having a surface in sliding contact with surfaces of adjacent wires of the plurality of wires, wherein the at least one cable is embedded within the body concentric with the body about the axis; and a plurality of damping insert locators extending radially away from the axis such that a first instance of the damping insert locators constrains movement of the at least one cable in a first direction, and a second instance of the damping insert locators constrains movement of the at least one cable in a second direction, opposite the first direction, wherein the at least one cable comprises a first friction damping ring having a first diameter, and a second friction damping ring having a second diameter larger than the first diameter, the first and second damping rings being concentric about the axis, wherein the first and second instances of the damping insert locators each comprise an elongate planar member having a first face and a second face separated from each other by a first contact side and a second contact side on opposing lateral sides of the first and second faces, wherein the second contact side comprises a first cutout portion defining a corresponding first support portion disposed between the first cutout portion and the first contact side, and a second cutout portion defining a corresponding second support portion disposed between the second cutout portion and the first contact side, and wherein the first and second support portions constrain movement of the first and second friction damping rings in the first direction responsive to the first contact side being disposed proximate a side boundary wall of a rotor core tool prior to casting of the body, and constrain movement of the first and second friction damping rings in the second direction responsive to the second contact side being disposed proximate the side boundary wall of the rotor core tool prior to casting of the body.

* * * * *